United States Patent
Drummond

(10) Patent No.: US 9,914,824 B2
(45) Date of Patent: Mar. 13, 2018

(54) BIODEGRADABLE PLASTIC AND MANUFACTURE THEREOF FROM RECYCLABLE PLASTIC

(71) Applicant: Drummond Jefferson, Fort Worth, TX (US)

(72) Inventor: Jeferson Drummond, Fort Worth, TX (US)

( * ) Notice: Subject to any disclaimer, the term of this patent is extended or adjusted under 35 U.S.C. 154(b) by 3 days.

(21) Appl. No.: 14/894,516

(22) PCT Filed: May 30, 2014

(86) PCT No.: PCT/US2014/040276
§ 371 (c)(1),
(2) Date: Nov. 28, 2015

(87) PCT Pub. No.: WO2014/194219
PCT Pub. Date: Dec. 4, 2014

(65) Prior Publication Data
US 2016/0108217 A1    Apr. 21, 2016

Related U.S. Application Data

(60) Provisional application No. 61/828,929, filed on May 30, 2013.

(51) Int. Cl.
| | |
|---|---|
| C08G 64/00 | (2006.01) |
| C08L 23/06 | (2006.01) |
| B29B 17/00 | (2006.01) |
| B02C 23/08 | (2006.01) |
| B29B 17/04 | (2006.01) |
| B29C 47/00 | (2006.01) |
| B29B 17/02 | (2006.01) |
| B29K 23/00 | (2006.01) |
| B29K 105/26 | (2006.01) |

(52) U.S. Cl.
CPC .............. *C08L 23/06* (2013.01); *B02C 23/08* (2013.01); *B29B 17/00* (2013.01); *B29B 17/0412* (2013.01); *B29C 47/0004* (2013.01); *B29B 17/02* (2013.01); *B29B 2017/001* (2013.01); *B29B 2017/0203* (2013.01); *B29K 2023/06* (2013.01); *B29K 2023/065* (2013.01); *B29K 2023/0633* (2013.01); *B29K 2105/26* (2013.01); *B29K 2995/006* (2013.01); *Y02W 30/62* (2015.05); *Y02W 30/622* (2015.05)

(58) Field of Classification Search
CPC ..................................................... C08L 23/06
USPC ............................................................ 521/40
See application file for complete search history.

(56) References Cited

U.S. PATENT DOCUMENTS

| | | | |
|---|---|---|---|
| 5,240,656 A * | 8/1993 | Scheeres | ............... B29B 13/022 219/421 |
| 6,946,506 B2 | 9/2005 | Bond | |
| 7,235,594 B2 | 6/2007 | Han et al. | |
| 7,291,664 B2 | 11/2007 | Hao | |
| 2004/0035757 A1 | 2/2004 | Vandeputte | |

FOREIGN PATENT DOCUMENTS

| | | |
|---|---|---|
| CN | 101 402 756 A | 4/2009 |
| WO | WO2013057737 | 4/2013 |

\* cited by examiner

*Primary Examiner* — Terressa Boykin
(74) *Attorney, Agent, or Firm* — John Lindsay

(57) ABSTRACT

A process for manufacturing biodegradable plastic from high percentage recyclable plastic feedstock and the product thereof. The process includes receiving recyclable plastic feedstock including high density polyethylene, low density polyethylene, expanded polyethylene, and stretched wrap, separating the plastic feedstock by plastics of like type, grinding the separated plastics into particulate while maintaining the temperature below said separated plastic's decomposition and melting point. The plastics are mixed in proportion, adding a biodegradable additive to the particulated plastic mixture with further mixing to produce the biodegradable plastic. Optionally, the resulting plastic is extruded for later use.

20 Claims, 2 Drawing Sheets

BIODEGRADABLE PLASTIC AND MANUFACTURE THEREOF FROM RECYCLABLE PLASTIC

PRIORITY

The present invention claims priority to provisional application 61/828,929, which has a filing date of May 30, 2013 and is incorporated by reference.

BACKGROUND

Field of the Invention

The present invention relates to biodegradable plastic, more specifically biodegradable plastic manufactured from a high percentage of recyclable plastic.

Description of the Related Art

Plastics have become an indispensable part our society due to their wide range of uses, relative light weight, and low cost. Plastics include any of a wide range of synthetic or semi-synthetic organic solids that are moldable. Plastics are typically organic polymers of high molecular mass. They are usually synthetic, most commonly derived from petrochemicals. However, their ubiquity has also come with problems. Their stability makes disposal of plastic products a problem. They often litter the landscape for years due to their stability. Two divergent approaches have been employed to attempt to solve the problem, namely recycling and biodegradable additives.

Plastic recycling is the process of recovering scrap or waste plastic and reprocessing the material into useful products, sometimes completely different in form from their original state. For instance, this could mean melting down soft drink bottles and then molding them as plastic chairs and tables. Typically a plastic is not recycled into the same type of plastic. Even during the typical recycling process, when different types of plastics are melted together, they tend to phase-separate and settle in layers. The phase boundaries cause structural weakness in the resulting material, meaning that polymer blends are useful in only limited applications.

The second approach is biodegradable additives. Biodegradable plastics are plastics that are capable of being decomposed by bacteria or other living organisms. Two basic classes of biodegradable plastics exist: bioplastics, whose components are derived from renewable raw materials and plastics made from petrochemicals with biodegradable additives which enhance biodegradation.

It would be advantageous to employ a product and process which can incorporate both approaches in order to minimize unnecessary disposal of plastic. For the above reasons, it would be advantageous to create a biodegradable plastic manufactured from a high percentage of recyclable plastic feedstock.

SUMMARY

The present invention is directed to a process for manufacturing biodegradable plastic from high percentage recyclable plastic feedstock and the product thereof. The process comprises receiving recyclable plastic feedstock including high density polyethylene, low density polyethylene, expanded polyethylene, and stretched wrap, separating the plastic feedstock by plastics of like type, grinding the separated plastics into particulate while maintaining the temperature below said separated plastic's decomposition and melting point. The plastics are mixed in proportion, adding a biodegradable additive to the particulated plastic mixture with further mixing to produce the biodegradable plastic. Optionally, the resulting plastic is extruded for later use.

These and other features, aspects, and advantages of the invention will become better understood with reference to the following description, and accompanying drawings.

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
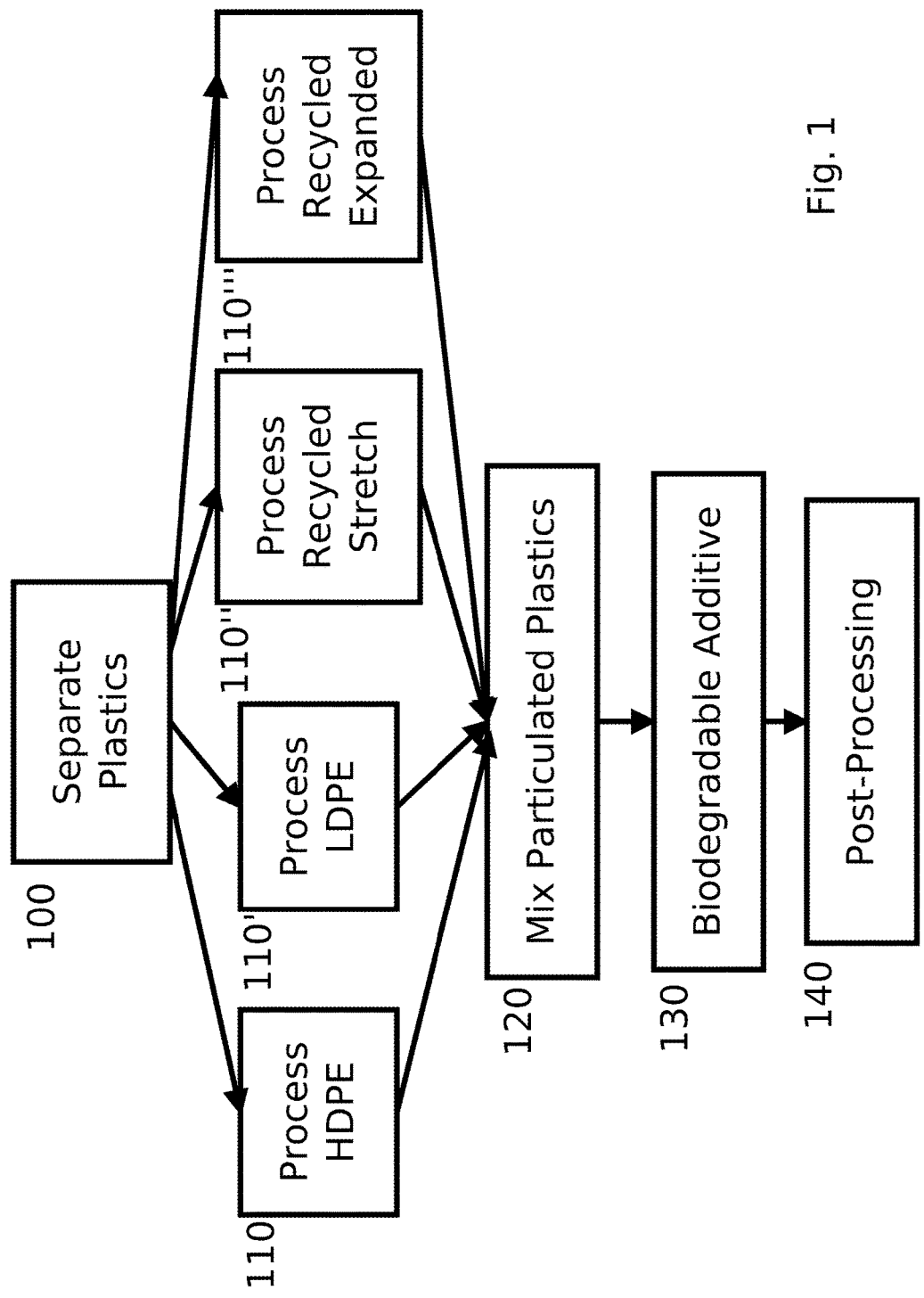
FIG. 1 depicts a process for manufacture of a biodegradable plastic according to the current invention.

The present invention is directed to a process for manufacturing biodegradable plastic from recyclable plastics and the product thereof. A further aspect of includes a hopper for processing the recyclable plastics. Referring to FIG. 1, the process includes separating the recyclable plastics 100, grinding the recyclable plastics into particulate 110, forming a composition of particulated plastics 120, adding a biodegradable additive 130, and optional post-processing of the biodegradable plastic 140. Each of these steps will be considered in more detail below.

The first step is to receive and separate the feedstock plastics 100. The feedstock plastics 08 may come from a recycling program, landfill, or similar sources. The feedstock plastics 08 include recyclable plastics. In the exemplary system and process, the recyclable plastics can include high density polyethylene (HDPE), low density polyethylene (LDPE), expanded polyethylene, and stretched wrap. It should be understood that other recyclable plastics can be employed as feedstock. HDPE is a polymer made from the ethylene monomer with a low degree of branching and having the chemical formula $(C_2H_4)_n$. It typically has a melting point range of about 120°-180° C., depending upon the grade. LDPE is a polymer made from the ethylene monomer with high degree of short and long chain branching and having the chemical formula $(C_2H_4)_n$. It typically has a melting point range of about 105°-120° C., depending upon the grade. Expanded polyethylene is a ethylene based polymer made and formed into a closed-cell foam. Stretched wrap most commonly comprises linear low-density polyethylene, which is a polymer made from the ethylene monomer with significant numbers of short branches, commonly made by copolymerization of ethylene with longer-chain olefins. It typically has a melting point range of about 120°-160° C., depending upon the grade.

The feedstock plastics 08 are separated 100. Items besides plastics are removed. The feedstock plastics 08 are cleansed in order to remove contaminants. The feedstock plastics 08 are separated and sorted according to the type plastic. In one process, the feedstock plastics 08 are manually separated. The sorter preferably uses the Plastic Identification Code stamped on the feedstock plastics 08. In an alternate process, the system incorporates machine identification of the recyclable plastics using techniques such as spectroscopy (infrared), black light, light polarization, or other approaches. Additional disclosure on separation is include in U.S. Pat. No. 5,894,939 to Frankel, which is hereby incorporated by reference. At the conclusion of this step 100, there are hoppers 20, each containing a type of recyclable plastic.

Figure 2:
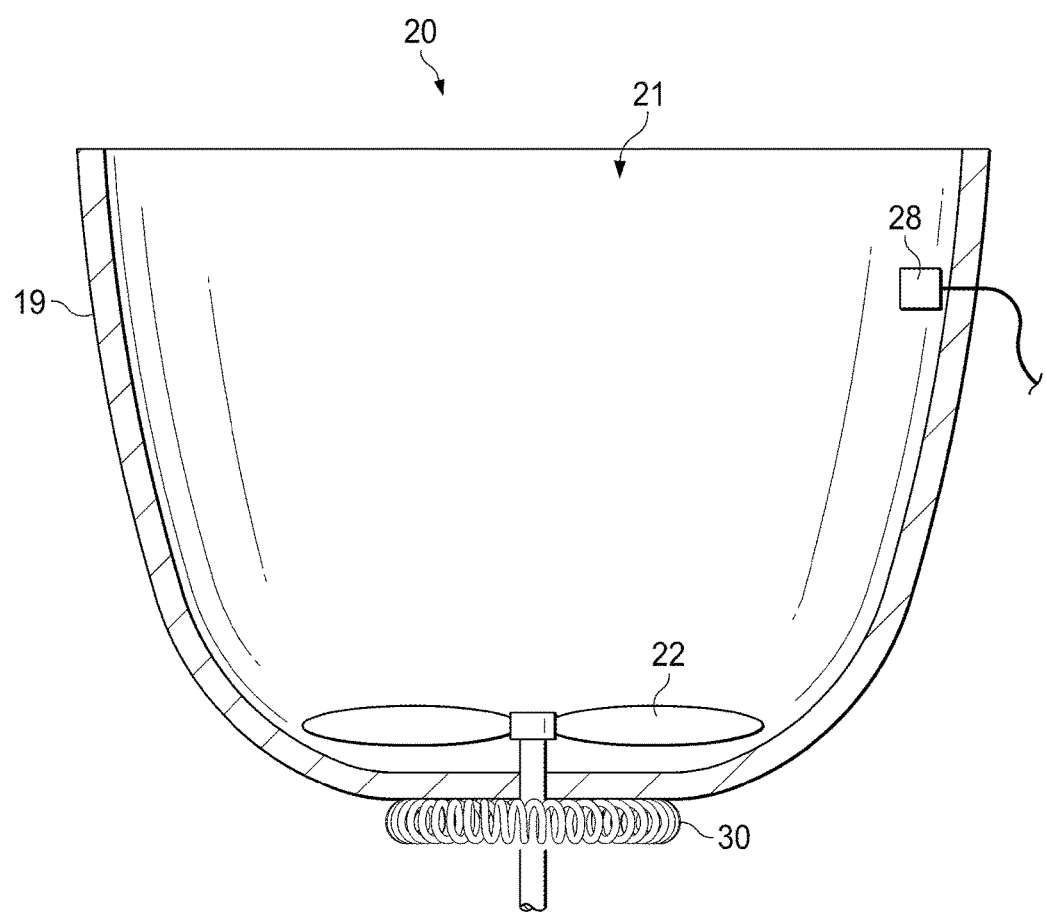
FIG. 2 depicts a hopper assembly of the current invention.

Each type of recyclable plastic feedstock 08 is processed 110 110' 110" 110'''. referring to FIG. 2, each hopper assembly 20 includes an interior region 21 bounded by the hopper 19, presenting a perimeter. Within the interior region 21 of the exemplary hopper assembly 20 is disposed a temperature sensor 28, a grinder blade 22, and an optional heat source 30. The grinder blade 22 is preferably disposed in the bottom of the interior region 21 of the hopper 20 and pivotably mounted for rotary motion. In the exemplary configuration, the temperature sensor 28, grinder blade 22, and heat source 30 are in communication with a controller.

Referring back to FIG. 1, each of the separated recyclable plastic feedstock 08 is processed separately in the hopper assembly 110 110' 110" 110''', in part to reduce the recyclable plastic feedstock 08 from its original shape and dimensions into particulate, increase uniformity and surface area. In the exemplary system, the hopper assembly 20 is configured to reach a maximum temperature within the interior region 21. The maximum temperature is configured to according to the melt and burn temperature of the subject plastic 110 110' 110" 110''', such that the particle size is reduced without exceeding the melt temperature or decomposition temperature. The maximum temperature is configured below the threshold temperatures. One representative hopper assembly 20 system is the Navarini Densifier Agglomerator.

In an alternate approach 110 110' 110" 110''', the process employs a cold enclosed region for reducing the feedstock plastic 08 to particulate plastic 16. A representative product is the PolarFit product by Air Products.

The grinder blade 22 is activated. The recyclable plastic feedstock is placed in the interior region 21, and a fluid may be added during this stage in order to decrease temperature. The exemplary fluid is water, although an air current or other fluid is within the spirit of this invention. Where gas is employed, the interior region 21 may be sealed and a gas forced through inflow and outflow ports for cooling. The mixture is continuously ground, producing frictional heat, while the temperature is monitored. If the temperature reaches the threshold, lower temperature fluid is added. The processing is complete when the recyclable plastic feedstock is reduced to particulate material. The exemplary composition of the particulate feedstock 16 after processing is a pulpy mixture, with the particles having an average size of less than about 1.5 centimeters on their longest dimension.

The particulate feedstock 16 of each of the HDPE, LDPE, expanded polyethylene, and stretch wrap hoppers is mixed in proportions 120 prior to addition of the biodegradable additive. A similar hopper assembly 20 as disclosed above is employed for this step. In one embodiment, the mixed composition includes from about 2% to 15% particulate HDPE, from about 25% to 35% particulate LDPE, from about 33% to 43% particulate expanded polyethylene, and about 15% to 25% particulate stretch wrap, with the remainder being from about 0.02% to 3.5% biodegradable additive by volume. In an exemplary embodiment, the composition by volume includes about 10% particulate HDPE, about 30% particulate LDPE, 38% particulate expanded polyethylene, about 20% particulate stretch wrap, and about 1.0% biodegradable additive by volume.

The mixed composition is added to the hopper assembly 20. The blade 22 is activated in order to start mixing the slurry.

As disclosed above, a biodegradable additive is added to the mixed particulate composition 130. A suitable biodegradable additive is one which gradually decomposes the final plastic in the presence of moisture, bacteria, and/or other living organisms, commonly by allowing microorganisms to utilize the carbon within the polymer chain itself. The exemplary class of biodegradable additive are oxo-biodegradable additives, which further facilitate biodegradation when the plastic is exposed to oxygen, sunlight, heat, and/or mechanical stress. An exemplary additive is available as a formulation under trade name DCP-126 available from EPI at http://www.epi-global.com. Alternate prospective active ingredient additives include metal carboxylates. Representative metal carboxylates include cobalt stearate, ferric stearate, cerium stearate, manganese stearate, vanadium stearate. Alternate prospective active ingredient additives include metal carboxylates combined with aliphatic polyhydroxy carboxyl acid. Representative metal carboxylates compositions include cobalt stearate, ferric stearate, cerium stearate, manganese stearate, vanadium stearate and an aliphatic polyhydroxy carboxyl acid. A representative aliphatic polyhydroxy carboxyl acid includes citric acid. It is contemplated that the additive may further include calcium oxide to make the modified plastic more processable.

Additional disclosure for the biodegradable additives is included in U.S. Pat. No. 5,565,503 to Garcia, et al., which is hereby incorporated by reference; U.S. Pat. No. 5,854,304 to Garcia, et al., which is hereby incorporated by reference; U.S. Pat. App. No. 20010003797 to Guevara, et al., which is hereby incorporated by reference; and U.S. Pat. App. No. 20090056209 to Baciu et al., which is hereby incorporated by reference; and U.S. Pat. App. No. 20130045054 to Kozak, which is hereby incorporated by reference. Additional disclosure for the additives is included in "Oxo-biodegradable full carbon backbone polymers e biodegradation behaviour of thermally oxidized polyethylene in an aqueous medium" to Chiellini et al, which is annexed and incorporated by reference. Additional disclosure for the additives is included in "Oxo-biodegradable carbon backbone polymers—Oxidative degradation of polyethylene under accelerated test conditions" to Chiellini, which is annexed and incorporated by reference. Additional disclosure for the additives is included in "Polyolefins with controlled environmental stability" to David, which is annexed and incorporated by reference. Additional disclosure for additives is included in "Environmental Biodegradation of polyethylene" to Bonhomme, which is incorporated by reference. Additional disclosure for the additives is included in "Biodegradation of Thermally-Oxidized, Fragmented Low density Polyethylenes" to Chiellini, which is annexed and incorporated by reference. Additional disclosure for the additives is included in "Environmentally Degradable Plastics Based on Oxo-biodegradation of Conventional Polyolefins" to Billingham, which is annexed and incorporated by reference. Additional disclosure for the additives is included in "Environmentally Degradable Plastics Based on Oxo-biodegradation of Conventional Polyolefins" to Billingham, which is annexed and incorporated by reference. Additional disclosure for the additives is included in "Programmed—Life Plastics from Polyolefins: A New Look at Sustainability" to Scott, which is annexed and incorporated by reference. Additional disclosure on additives is included in "Controlled—Lifetime Environmentally Degradable Plastics Based on Conventional Polymers" to Billingham, which is annexed and incorporated by reference.

A suitable biodegradable additive is added in proportion in order to optimize shelf life and biodegradation time. One configuration includes about 0.02% to 3.5% biodegradable additive by volume. Another configuration includes about 1% biodegradable additive by volume.

The biodegradable plastic can be extruded into pellets, shaped, or used in other post-processing activity 140. Flexible plastic products such as trash bags, grocery bags, shopping bags, or agricultural film may be formed. It is also contemplated that durable goods such as packaging or bottles may be molded.

EXAMPLE 1

This example describes the preparation of an embodiment of the plastic of the current invention. A batch of recycled plastics was provided. The recycled plastic feedstock 08 were manually separated into HDPE, LDPE, recycled stretch, and recycled expanded types 100. Non-plastic materials were removed and the plastics were cleansed. Each recycled plastic type was processed separately 110. The blade 22 was activated. Each type was placed into a hopper assembly 20. The separated recycled plastic was added to the interior region 21. The hopper assembly 20 content was occasionally stirred. A thermometer 28 placed in the interior region 21 was monitored and water was added as the threshold temperature was approached. The following dry mixture was prepared from the particulate feedstock 16 in the following proportion:

| Component | Percentage by Volume |
| --- | --- |
| Recycled HDPE | 10 |
| Recycled LDPE | 30 |
| Recycled Expanded | 39 |
| Recycled Stretch | 20 |

The dry mixture was mixed with DCP-126 in 99:1 ratio by volume and the total mixture was thoroughly mixed. The resulting plastic composition was extruded and formed into plastic trash bags. The resulting trash bags were subjected to ultraviolet radiation, heat, and moisture in order to simulate sun, heat, cooling, and rain cycle conditions. The trash bags were also subjected to thermal degradation testing. The results indicated that the trash bags had a minimum shelf life of twelve months and would biodegrade in landfill conditions within 24-36 months. The results also indicated a suitable tensile strength. Complete test results are in the appendix.

Applicant reserves the right to exclusively claim an altered version of the described, being a non-biodegradable plastic whose composition is 100% recycled content produced using all of the production methods described above, it excluding only the addition of the biodegradable agent.

Insofar as the description above and the accompanying drawings disclose any additional subject matter, the inventions are not dedicated to the public and the right to file one or more applications to claim such additional inventions is reserved.

What is claimed is:

1. A process for producing biodegradable plastic from recyclable plastic, said process comprising:
   receiving recyclable plastic feedstock comprising high density polyethylene, low density polyethylene, expanded polyethylene, and stretched wrap;
   separating said plastic feedstock into their respective types;
   grinding said separated plastics into particulate, maintaining the temperature below said separated plastic's decomposition and melting point;
   mixing said particulated plastics in proportion;
   adding a biodegradable additive to the particulated plastic mixture with mixing.

2. The process of claim 1, wherein said particulated plastics comprise about 2% to 15% by volume high density polyethylene, from about 25% to 35% by volume low density polyethylene, from about 33% to 43% by volume expanded polyethylene, from about 15% to 23% by volume stretched wrap, and about 1% biodegradable additive.

3. The process of claim 1, wherein said particulated plastics comprise about 10% by volume high density polyethylene, about 30% by volume low density polyethylene, about 39% by volume expanded polyethylene, about 20% by volume stretched wrap, and about 1% biodegradable additive.

4. The process of claim 1, wherein said biodegradable additive comprises about 0.02% to 3.5% by volume of said particulated plastics mixture.

5. The process of claim 1, wherein said biodegradable additive comprises about 1% by volume of said particulated plastics mixture.

6. The process of claim 1, wherein said biodegradable additive is selected from the group of a metal carboxylate and a metal carboxylate combined with an aliphatic polyhydroxy carboxyl acid.

7. The process of claim 1, wherein said biodegradable additive is selected from the group of cobalt stearate, ferric stearate, cerium stearate, manganese stearate, and vanadium stearate.

8. The process of claim 1, wherein said biodegradable additive comprises a polyhydroxy carboxyl acid and at least of one cobalt stearate, ferric stearate, cerium stearate, manganese stearate, and vanadium stearate.

9. The process of claim 1, wherein said biodegradable additive comprises citric acid and at least of one cobalt stearate, ferric stearate, cerium stearate, manganese stearate, and vanadium stearate.

10. The process of claim 6, further comprising a calcium oxide.

11. The process of claim 1, wherein said particulate is ground to less than 1.5 centimeters in width.

12. The process of claim 1 further comprising extruding the resulting biodegradable plastic mixture.

13. A process for producing biodegradable plastic from recyclable plastic, said process comprising:
   receiving recyclable plastic feedstock comprising high density polyethylene, low density polyethylene, expanded polyethylene, and stretched wrap;
   separating said plastic feedstock into their respective types;
   grinding said separated plastics into particulate, maintaining the temperature below said separated plastic's decomposition and melting point;
   mixing said particulated plastics in proportion, wherein said particulated plastics comprise about 2% to 15% by volume high density polyethylene, from about 25% to 35% by volume low density polyethylene, from about 33% to 43% by volume expanded polyethylene, from about 15% to 23% by volume stretched wrap;

adding a biodegradable additive to the particulated plastic mixture with mixing, wherein said biodegradable additive comprises about 0.02% to 3.5% by volume.

14. The process of claim 13, wherein said biodegradable additive is selected from the group of a metal carboxylate and a metal carboxylate combined with an aliphatic polyhydroxy carboxyl acid.

15. The process of claim 13, wherein said biodegradable additive is selected from the group of cobalt stearate, ferric stearate, cerium stearate, manganese stearate, and vanadium stearate.

16. The process of claim 13, wherein said biodegradable additive comprises a polyhydroxy carboxyl acid and at least of one cobalt stearate, ferric stearate, cerium stearate, manganese stearate, and vanadium stearate.

17. The process of claim 13, wherein said biodegradable additive comprises citric acid and at least of one cobalt stearate, ferric stearate, cerium stearate, manganese stearate, and vanadium stearate.

18. The process of claim 14, further comprising extruding the resulting biodegradable plastic mixture.

19. A biodegradable plastic produced from recyclable plastic prepared by a process comprising the steps of:

receiving recyclable plastic feedstock comprising high density polyethylene, low density polyethylene, expanded polyethylene, and stretched wrap;

separating said plastic feedstock into their respective types;

grinding said separated plastics into particulate, maintaining the temperature below said separated plastic's decomposition and melting point;

mixing said particulated plastics in proportion, wherein said particulated plastics comprise about 10% by volume high density polyethylene, about 30% by volume low density polyethylene, about 39% by volume expanded polyethylene, about 20% by volume stretched wrap; and adding a biodegradable additive to the particulated plastic mixture with mixing, wherein said biodegradable additive comprises about 1.0% by volume, said biodegradable additive is selected from the group of cobalt stearate, ferric stearate, cerium stearate, manganese stearate, and vanadium stearate.

20. The product of claim 19, further comprising extruding the resulting biodegradable plastic mixture.

* * * * *